Figure 1:
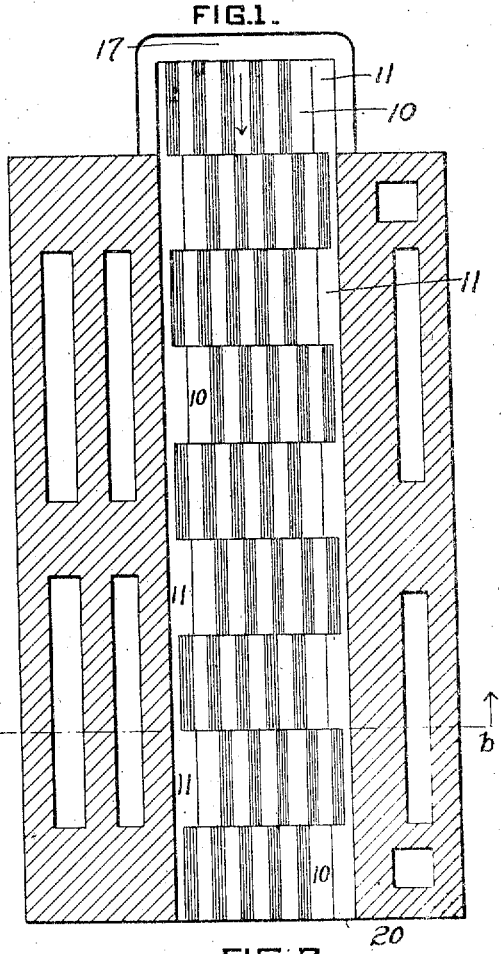

T. V. ALLIS.

PAIR HEATING FURNACE HEARTH.

APPLICATION FILED OCT. 30, 1915.

Reissued Dec. 14, 1915.

14,032.

3 SHEETS—SHEET 1.

WITNESSES

J. Hoffat Bradley

Thos. B. Jayes

INVENTOR

Thomas V. Allis by Dennis S. Dorcott atty

T. V. ALLIS.

PAIR HEATING FURNACE HEARTH

APPLICATION FILED OCT. 30, 1915.

Reissued Dec. 14, 1915.

14,032.

3 SHEETS—SHEET 2.

WITNESSES

J. Hoffstot Bradley

Thos B. Jayne

INVENTOR

Thomas V. Allis by Dennis S. Wolcott

Atty.

T. V. ALLIS.

PAIR HEATING FURNACE HEARTH.

APPLICATION FILED OCT. 30, 1915.

Reissued Dec. 14, 1915.

14,032.

3 SHEETS—SHEET 3.

WITNESSES

J. Herbert Bradley

Thos. B. Hayes

INVENTOR

Thomas V. Allis by Dennis S. Wolcott

Atty

UNITED STATES PATENT OFFICE.

THOMAS V. ALLIS, OF PITTSBURGH, PENNSYLVANIA.

PAIR-HEATING-FURNACE HEARTH.

14,032. Specification of Reissued Letters Patent. Reissued Dec. 14, 1915.

Original No. 1,034,858, dated August 6, 1912, Serial No. 453,977. Application for reissue filed October 30, 1915. Serial No. 58,915.

*To all whom it may concern:*

Be it known that I, THOMAS V. ALLIS, a citizen of the United States, formerly residing at Bridgeport, in the county of Fairfield and State of Connecticut, but now residing at Pittsburgh, in the county of Allegheny and State of Pennsylvania, have invented certain new and useful Improvements in Pair-Heating-Furnace Hearths; and I do hereby declare the following to be a full, clear, and exact description of the invention such as will enable others skilled in the art to which it appertains to make and use the same.

My invention relates to pair heating furnaces and it consists of an improved hearth designed to be used in the heating chamber of such furnaces to uphold sheet bars placed thereon, supporting them upon one of their sides, and a lower edge in a position inclined laterally to the perpendicular, thereby economizing space and increasing the heating capacity of such chamber, and when employed in continuously heating such bars, it enables them to be forced along the hearth in parallel rows.

The benefits derived from the use of my improved hearth in the ordinary pair heating chamber of the present sheet mill furnace consist: First, in the ability to charge a greater number of said bars therein all more advantageously located than now possible, thereby giving them the necessary time to become mellowed by the mild soaking heat required for that purpose. Second, by heating the bars slowly they are brought to the proper rolling temperature without raising damaging scale upon their surface. Third, more continuous working is possible for the reason that cold bars may soon be charged after the hot bars are taken out, so that, by the time the hot bars have been progressively withdrawn along the hearth, those at the opposite end from which the hot bars were last drawn are in condition to roll, thus a system of rotative heating is established. Fourth, more bars are heated per unit of fuel consumed, from the fact that the hearth constantly receives and discharges the bars uniformly. Fifth, the work of the heater is less laborious as he is not, under all conditions, obliged to manipulate and pile the bars within the chamber. All of the above described benefits accrue alike in the use of my herein described improved hearth in heating sheet bars in a continuous manner.

Figure 4:
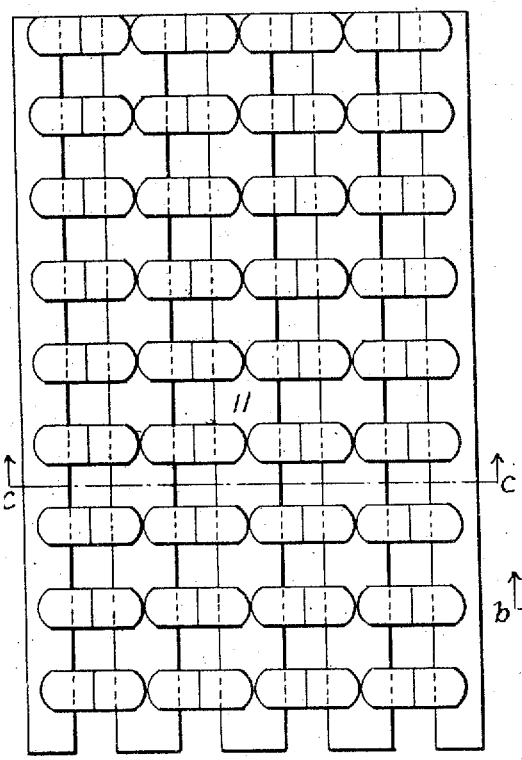
Figure 5:
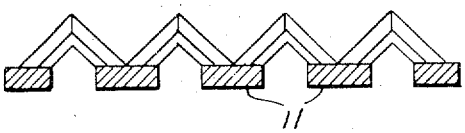
Figure 2:
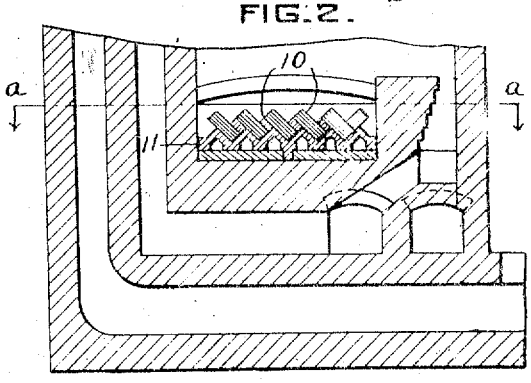
Figure 3:
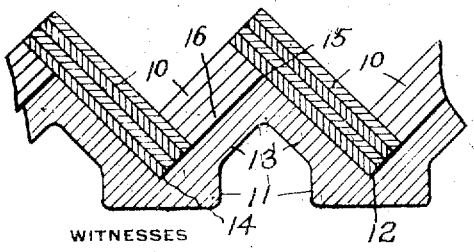
Figure 6:
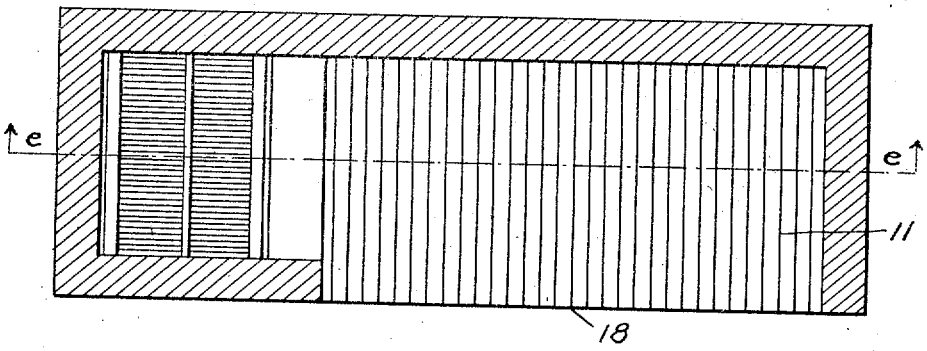
Figure 7:
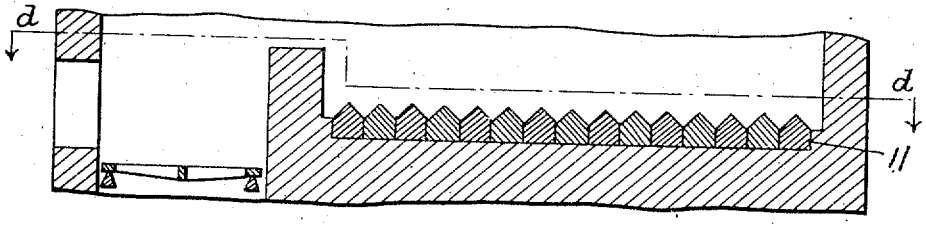
Figure 8:
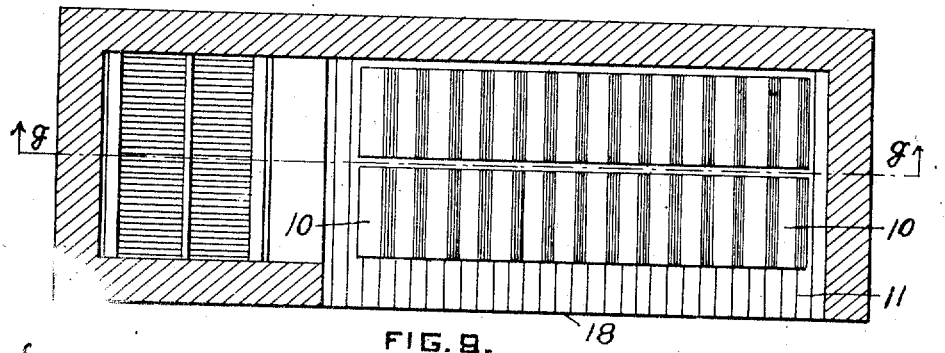
Figure 9:
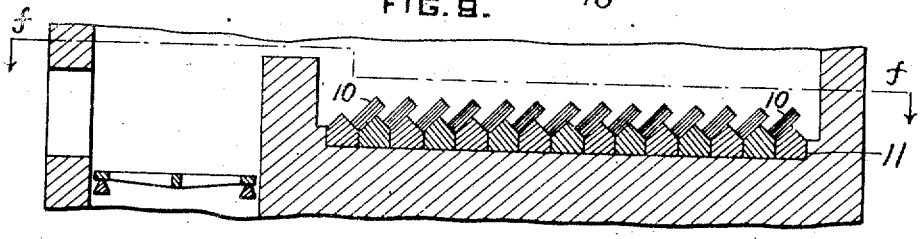
Figure 10:
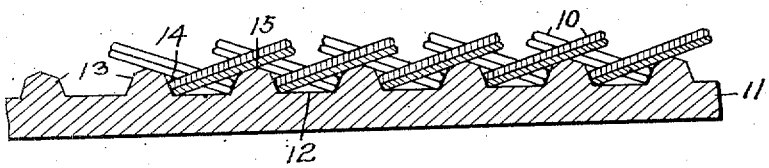
Figure 11:
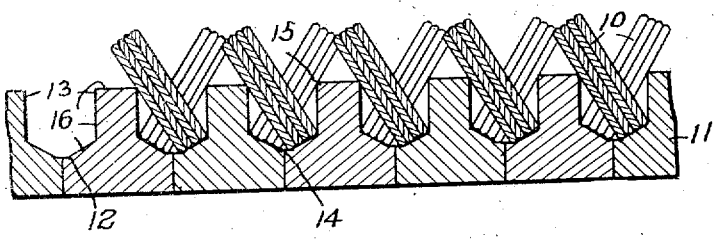
Figure 12:
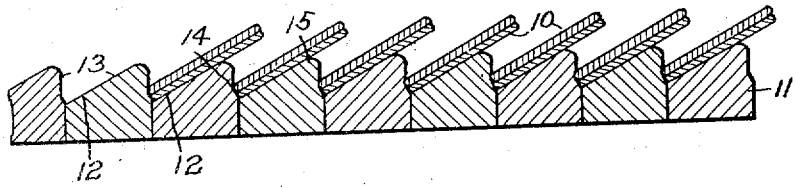

Figure 1 of the accompanying drawings is a horizontal section of a gas fired continuous heating furnace taken on line *a*, *a*, of Fig. 2 and shows in plan, collections of sheet bars cut to length with their ends crossed in reverse angular abutment and upheld upon my improved hearth within the heating chamber of said furnace. Fig. 2 is a transverse section on line *b*, *b*, of Fig. 1. Fig. 3 is a section broken from said hearth through its base and the center of a portion of its vertical projections, with sheet bars standing in the grooves thereon formed by said projections and in reverse angular abutment; two of the collections of bars are shown in cross section, and portions of two in end elevation, all enlarged. Fig. 4 is an enlarged plan view of my improved cast steel hearth shown in Figs. 1, and 2; the base has integrally connected individual projections disposed over its top surface, which form a series of parallel grooves suitable to uphold therein sheet bars in angular position. Fig. 5 is a transverse vertical section on line *c*, *c*, of Fig. 4. Fig. 6 is a plan view in longitudinal section on line *d*, *d* of Fig. 7 and shows the improved hearth constructed of burned fire clay or other refractory material and located in the heating chamber of an ordinary pair heating furnace, the fire-box and bridge wall common to such furnaces being shown. Fig. 7 is a vertical longitudinal section on line *e*, *e* of Fig. 6. Fig. 8 is a plan view in longitudinal section on line *f*, *f* of Fig. 9 and shows collections of sheet bars all upheld at one inclination upon said hearth with their adjacent ends separated. Fig. 9 is a vertical longitudinal section on line *g*, *g* of Fig. 8. Figs. 10, 11 and 12 are sections of varied forms of the hearth which may be constructed of metal or refractory material. Fig. 10, like Fig. 3, shows sheet bars upheld upon the hearth in reverse angular position having their ends twice crossed but supported more obliquely. Fig. 11, also like Fig. 3, shows sheet bars upheld upon the hearth in reverse angular position, but unlike Fig. 3, their ends are but once crossed and the bars are supported at a more acute angle. Fig. 12, like Fig. 9, shows sheet bars upheld at one and the same inclination to the perpendicular, the bars of Fig. 12, however, being supported at a more oblique angle by grooves and projections of saw tooth shape.

10 are sheet bars. 11 the improved hearth of varied shapes. 12 one of a series of parallel upholding grooves in hearth formed by parallel vertical projections. 13 the parallel vertical projections which form said grooves and constitute a part of the hearth. 14 the lateral angular bar supporting base of said projections and 15 upper bar supporting portion. 16 that portion of the projections of the hearth (see Figs. 3 and 11) which is uncovered by sheet bars while in the process of being heated. 17 of Fig. 1, a shelf at the charging end of the heating chamber. 18 of Figs. 6 and 8 the side of the heating chamber of an ordinary pair heating furnace in which the charging and discharging doors are located. They consist of a series of comparatively small doors that raise vertically and overlap each other at their sides, so that, while the large opening will be entirely closed when the doors are all down, all parts of the hearth are made accessible through said doors, which are not shown in the drawings. 19 is the charging end of the continuous heating chamber of Fig. 1 and 20 its discharging end.

The upholding hearth embodies two well known axioms. First, that a collection of rectangular shapes of given dimensions standing upright upon one of their edges with their sides in contact, occupy less transverse space than the same number of such shapes lying flatwise with their edges in contact, and while I do not place sheet bars upon my hearth in the first position above described, I do in a modified way, upholding them upon their lower edge and one of their sides at a greater or less inclination to the perpendicular.

The second axiom availed of is, that two rectangular pieces of solid material having their abutting portions crossed, can not be forced past each other or one over the other and that the power applied to move one piece moves its contacting neighbor in same sustained line and direction.

To utilize the above described axioms, I construct my improved hearth with a series of parallel grooves formed by a series of parallel projections, which together form a hearth having suitable grooves to uphold sheet bars placed therein in a position inclined laterally to the perpendicular and in conformity to the second axiom, the grooves bear such transverse relation to each other that when longitudinal rows of said bars are consecutively placed alternately, in sections, at a reverse angle within the grooves formed by said projections, they will cross at their adjacent ends.

Fig. 3 shows bars in collections standing reversed, and at an angle of 45 degrees; however, as the degrees of lateral inclination to the perpendicular are immaterial to my invention, the bars may stand at any angle preferred as shown in the drawings.

Projections 13 against which the bars are supported in angular position, form the side of an angle from base 14 to the extreme outer bar supporting portion 15 of preferably greater length than one-half the width of the bars being heated to prevent them from falling sidewise over the top of the projections. Said projections may be of sufficient height, however, to form the side of an angle extending from said lateral base 14 to said outer portion 15 as great as the entire width of the bars, if desired, when the bars are not to cross at their ends above the projections.

One of the important benefits inherent to the use of my improved hearth is the following: Although the hearth of a heating chamber contains more bars per square foot when supported thereon at an angle of 45 degrees or thereabout, than can be placed in the same space when laid flatwise with edges and ends in contact, I still secure upon the hearth a large area of uncovered space 16, Fig. 3. This uncovered space is exposed to the normal heat of the furnace which it absorbs, so that, when sheet bars being heated in a continuous manner with their ends crossed in reverse angular abutment, each collection of bars is brought over the freshly heated supports which have been exposed to the same heat and for the same length of time as the bars. Hence, all of the collections of bars at each of their advanced steps are brought over the uncovered heated spaces which are of the same general caloric condition as the furnace, which not only prevents the under side of the bars from becoming chilled, but is a means of augmenting their temperature. The same advantages accrue to the use of my hearth when placed in any ordinary pair heating furnace, where, instead of arranging the rows of bars singly or in collection alternately at a reverse angle, the rows, may, if preferred, all be placed at the same angle and in one direction, as shown at Figs 8 and 9, there being no danger of the bars overriding each other as there is no impelling force brought against their ends, each collection being manipulated separately. In event of the bars all standing at the same angle and direction as shown in Figs. 8 and 9; it is obvious that the opposite surfaces of the supporting projections being largely uncovered by bars, are exposed to the same heat as the bars, consequently, when the next charge is placed against them and at a reverse angle to the preceding charge, the bars rest upon hot supports, so that, by alternating the position of each charge, the bars all have hot supports to rest against.

While the hearth of Fig. 12 does not possess the foregoing described characteristics of the hearths of Figs. 3, 9 and 11 for recuperating heat in the portion 16 of the equiangular projections 13 of those figures; the grooves 12 of Fig. 12 are closer together than grooves 12 of Figs. 3, 9 and 10 and 11, which gives the hearth of Fig. 12 greater bar upholding capacity per square foot than the hearths of said figures, the same number of bars being placed in respective grooves.

In operating my improved hearth in the heating chamber of an ordinary pair heating furnace, (see Figs. 6, 7, 8 and 9) the bars are charged thereon through doors located in side 18 of the chamber, (doors not shown) singly or in collection, standing either at the same or reversed inclination.

Before the commencement of a week or working period, and in order to gain time, the hearth is charged with its full complement of bars early enough to bring them all to rolling temperature by the time the "turn" comes on. Following the withdrawal of the hot bars, at one end of the hearth, to be rolled, others are charged to occupy reverse angular hot spaces in the same grooves. This operation is continued until all of the bars extending over the hearth have been withdrawn, at which time the metal at the opposite ends of the chamber from which heated bars were last drawn is not enough to roll; thus a rotative system of heating is established which continues throughout the working period.

To recover heat in the hearth of Fig. 12, the bars are manipulated somewhat differently from those of Figs. 8 and 9, and the act is accomplished by leaving the first groove 12, at the left of the figure vacant at the time the hearth is first charged with bars, which is after the hearth and all parts of the furnace have become thoroughly heated. When such bars are partially heated, those occupying the first groove at the right of the vacant groove 12 are turned over toward the left into said groove, this leaves the first previously occupied groove vacant and exposed to the normal temperature of the furnace which it soon assimilates; the next row of bars at the right of this re-heated groove is then turned toward the left into it, and as it is the hot top bar of the pair that comes in contact with the now re-heated surface of the groove, such groove is robbed of but little heat. This operation is continued until all of the bars across the hearth have been turned into temporarily vacated and re-heated grooves, at which time, the first bars are sufficiently hot to roll. After the hot bars occupying the first two grooves 12 at the left end of the hearth have been drawn, cold bars are charged into the second groove 12, which leaves the first groove again open and prepared for a duplication of the operation, which is constantly repeated.

In operating hearth 12, or any hearth of my invention herein described where the bars are turned in process of heating, it is preferable to heat and manipulate them in pairs instead of greater collections.

The hearths shown in Figs. 6, 7, 8, 9 and 12 are composed of burned fire clay or any suitable refractory material and may be employed with economical results in the pair heating furnace of general use where there is but little sliding movement of bars over the hearth's surface, although the cast steel hearth next below referred to is preferred.

The hearth of Figs. 1, 2, 3, 4 and 5 is the type preferably adopted in the heating chamber of my continuous heating furnace. It is by choice cast steel which is sufficiently refractory to withstand the mild soaking heat required to mellow sheet bars and kindred metal. The hearth extends out in the form of a shelf 17 (Fig. 1) beyond the charging end 19 of said chamber, a sufficient distance to uphold sheet bars of the greatest length. Upon this shelf transverse rows of the bars are placed singly or in collection, and in the laterally inclined and lineal position they are to retain while passing along the hearth which is in the longitudinal direction of their length as indicated by the arrow, and preferably with their ends twice crossed in reverse angular abutment as shown in Figs. 2, 3 and 10, although, if the chamber be short, the rows of bars may be forced over the hearth, all standing at the same angle and direction as shown in Figs. 8, 9 and 12. The shelf 17 being filled, the bars thereon are next forced within the chamber by a hydraulic ram or any approved means. The thus emptied shelf is again refilled with similar rows of bars which are also forced within the chamber. This operation is continued until the hearth is filled with bars its entire length. This completed, the bars are allowed to remain within the chamber until the transverse row at its discharge end 20 has reached the proper rolling temperature. The bars of this row are then withdrawn and rolled. After said transverse row of bars has been exhausted and the shelf 17 reloaded, the propelling mechanism is again applied to the exterior ends of the transverse rows of bars standing upon the shelf 17, which forces them into the chamber and at the same time advances the entire charge a distance equal to the length of said rows of bars which occupied the shelf. This action brings a transverse row of bars to the discharge end of the chamber properly heated and in position to be withdrawn the same as said first row. This operation is constantly but intermittently repeated throughout the week or working period. The plan of heating bars in a continuous heating furnace in advance of the first "turn" at the commencement of a working period is to be observed the same as that hereinbefore described in operating an ordinary pair heating furnace.

While I have herein described sheet bars as the form of metal my improved hearth is designed to uphold during the process of heating, it is obvious that it is equally well adapted to the upholding of tin plate bars or other metal of rectangular form in various lengths within the heating chamber of any suitable type of heating furnace.

It is characteristic of my improvement that each of the grooves is so proportioned as to width and depth that the distance from the surface against which the lower edges of the sheet bars bear, when placed in inclined positions in the grooves, to those portions, as the edges 15 which support the sheet bars laterally will have such relation to the length or width of the sheet bar measuring from such lower edge, that the bars will be in a state of stable equilibrium, *i. e.*, will not be liable to move from the desired angular positions. If the bars are arranged with the longer edges in contact with the surface 14, the distance from the latter to the line of bearing of the side supporting edge 15 should be equal and preferably greater than half the width of the bars. It is found desirable, in practice to make the grooves of such dimensions that the largest bars can be safely supported.

I claim herein as my invention:

1. A hearth for a pair heating furnace, provided with a plurality of grooves suitable for supporting sheet bars in an inclined position, said grooves being so proportioned that the distance from the edge supporting surface within the groove to the edge of the lateral support will be sufficient to maintain the sheet bars arranged in inclined positions in said groove in a condition of stable equilibrium.

2. A hearth for a pair heating furnace, provided with a plurality of grooves suitable for supporting sheet bars in an inclined position, said grooves being so proportioned that the distance from the edge supporting surface within the groove to the edge of the lateral support will be sufficient to maintain the sheet bars in inclined positions in said groove in a condition of stable equilibrium, the distance between adjacent grooves being less than the widths of the grooves.

3. A hearth for a pair heating furnace provided with a plurality of grooves suitable for supporting sheet bars in an inclined position, said grooves being so proportioned that the distance from the edge supporting surface within the groove to the edge of the lateral support, will be greater than half the distance from the supported edge to the opposite edge of the sheet bars.

4. The herein described hearth of a pair heating furnace, having its upper side composed of a series of parallel grooves which bear such transverse relation to each other that longitudinal rows of sheet bars, in sections, supported alternately at a reverse angle within the grooves and against the sides thereof, will cross at their adjacent ends.

In testimony whereof, I have signed my name to this specification in the presence of two subscribing witnesses.

THOMAS V. ALLIS.

Witnesses:

THOS. B. JOYCE.

ELIZABETH E. MOORHEAD.